US012343751B2

(12) United States Patent
Mangold et al.

(10) Patent No.: US 12,343,751 B2
(45) Date of Patent: Jul. 1, 2025

(54) FUNCTION CONTROL FOR AN ELECTROHYDRODYNAMIC ATOMIZER

(71) Applicant: J. WAGNER GmbH, Markdorf (DE)

(72) Inventors: Sebastian Mangold, Salem (DE); Manuel Fiesel, Überlingen (DE); Jens Ulbrich, Friedrichshafen (DE); Thomas Jeltsch, Friedrichshafen (DE); Alfred Göhring, Salem (DE); Jan Barthelmes, Heilgenberg (DE)

(73) Assignee: J. WAGNER GmbH, Markdorf (DE)

(*) Notice: Subject to any disclaimer, the term of this patent is extended or adjusted under 35 U.S.C. 154(b) by 693 days.

(21) Appl. No.: 17/309,725

(22) PCT Filed: Dec. 19, 2019

(86) PCT No.: PCT/EP2019/086281

§ 371 (c)(1),
(2) Date: Jun. 16, 2021

(87) PCT Pub. No.: WO2020/127712

PCT Pub. Date: Jun. 25, 2020

(65) Prior Publication Data

US 2022/0016649 A1 Jan. 20, 2022

(30) Foreign Application Priority Data

Dec. 21, 2018 (DE) ..................... 10 2018 133 439.7

(51) Int. Cl.
*B05B 5/053* (2006.01)
*A45D 34/04* (2006.01)
(Continued)

(52) U.S. Cl.
CPC .............. *B05B 5/053* (2013.01); *A45D 34/04* (2013.01); *B05B 5/043* (2013.01); *B05B 5/1691* (2013.01); *A45D 2200/057* (2013.01)

(58) Field of Classification Search
CPC ....... B05B 5/053; B05B 5/043; B05B 5/1691; B05B 5/025; B05B 9/0423; B05B 11/00; A45D 34/04; A45D 2200/057
(Continued)

(56) References Cited

U.S. PATENT DOCUMENTS 4,042,971 A * 8/1977 Brennecke ............... B05D 1/06 361/213
4,629,164 A * 12/1986 Sommerville ........ B05B 7/2486 239/69
(Continued)

FOREIGN PATENT DOCUMENTS

DE 69414756 T3 3/2005
DE 102018109456 A1 10/2018
(Continued)

OTHER PUBLICATIONS

International Search Report and Written Opinion for International Patent Application No. PCT/EP2019/086281, mailing date of Apr. 6, 2020, filing date of Dec. 19, 2019, 13 pages, with English Translation.
(Continued)

*Primary Examiner* — Arthur O. Hall
*Assistant Examiner* — Anna Thi Ho
(74) *Attorney, Agent, or Firm* — Christopher J. Volkmann; KELLY, HOLT & CHRISTENSON, P.L.L.C.

(57) ABSTRACT

A method for the function control of an electrohydrodynamic atomizer, wherein an electrohydrodynamically atomized fluid, originating from the atomizer, is applied to a body, e.g. a person, in order to coat this body at least in certain areas, wherein the atomizer-comprises a fluid tank for storing the fluid and at least one high voltage source for making available a high voltage and at least one pump unit for transporting the fluid, wherein the fluid is delivered to a
(Continued)

Figure 1:
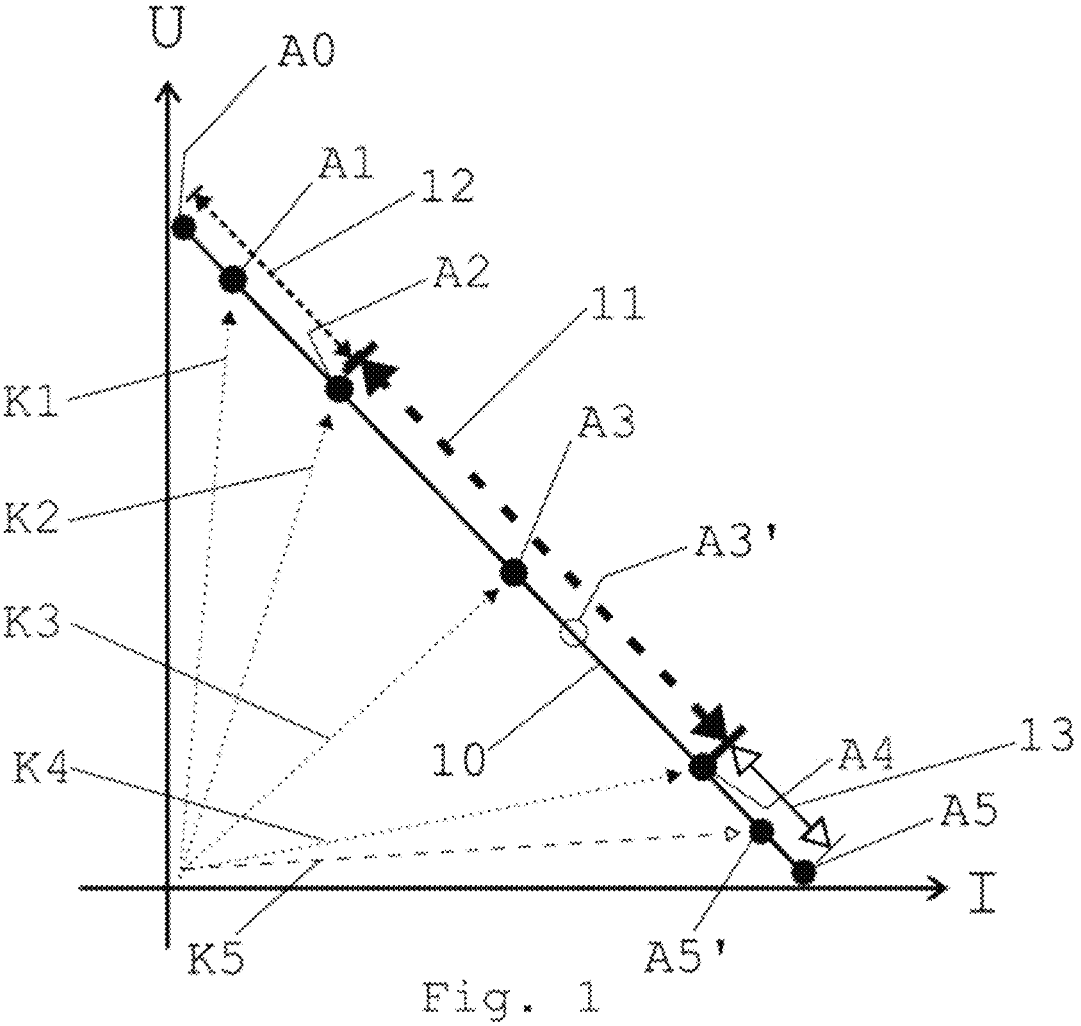

nozzle arrangement of the atomizer by means of the pump unit, and wherein the fluid is atomized electrohydrodynamically at the nozzle arrangement by means of the effect of the high voltage from the high voltage source, wherein a voltage and/or a current at the high voltage source is evaluated in order to acquire a working point of the high voltage source via a current/voltage characteristic curve.

12 Claims, 5 Drawing Sheets

(51) Int. Cl.
*B05B 5/043* (2006.01)
*B05B 5/16* (2006.01)

(58) Field of Classification Search
USPC .............................................................. 239/3
See application file for complete search history.

(56) References Cited

U.S. PATENT DOCUMENTS 4,916,571 A * 4/1990 Staheli ...................... B05B 5/10 361/235
5,056,720 A * 10/1991 Crum ...................... B05B 5/053 239/708
5,063,350 A * 11/1991 Hemming ............. G01R 15/14 324/457
5,067,434 A * 11/1991 Thur ..................... B05B 5/0531 361/228
5,121,884 A * 6/1992 Noakes ................. B05B 5/1691 239/708
5,351,903 A * 10/1994 Mazakas ............... B05B 7/1472 239/707
5,481,260 A * 1/1996 Buckler ................ B05C 5/0225 340/614
5,566,042 A * 10/1996 Perkins ................. B05B 5/0531 361/228
5,847,945 A * 12/1998 Burtin .................... H02H 7/003 363/59
6,381,109 B1 * 4/2002 Burtin .................... H02H 7/003 361/225
6,860,439 B2 * 3/2005 Balachandran ........... B05B 1/02 239/690
7,152,817 B2 * 12/2006 Wilson .................. B05B 5/1691 239/708
7,712,687 B2 * 5/2010 Wilson .................. B05B 5/1691 239/708
10,322,424 B2 * 6/2019 Wright ...................... A61L 2/22
11,872,582 B2 * 1/2024 Barthelmes ............ A45D 34/04
2009/0134249 A1 * 5/2009 Uratani ................... B05B 5/006 239/690
2009/0235864 A1 * 9/2009 Khoury ................. B05B 12/087 118/712
2012/0180722 A1 * 7/2012 Nolte ...................... B05B 12/08 118/712
2012/0219700 A1 * 8/2012 Herre .................... B05B 12/122 901/43
2014/0052294 A1 * 2/2014 Herre ................... G05B 19/404 901/43
2014/0151471 A1 * 6/2014 Dau ...................... B05B 5/0255 239/690
2014/0263709 A1 * 9/2014 Kocer ................... B05B 1/3006 239/11
2015/0266039 A1 * 9/2015 Ulrich ...................... H02K 1/02 310/90
2016/0008829 A1 * 1/2016 Dau ...................... B05B 5/0255 239/3
2016/0030957 A1 * 2/2016 Dau ...................... B05B 5/0255 239/3
2020/0094279 A1 * 3/2020 Matsuoka ............... B05B 15/65
2020/0114376 A1 * 4/2020 Barthelmes ........... B05B 5/0255
2021/0379608 A1 * 12/2021 Mangold ................. B05B 5/043

FOREIGN PATENT DOCUMENTS

EP 2065096 A1 * 6/2009 ............. B05B 5/006
JP 4151742 B1 * 9/2008
JP 2009115438 A 5/2009
WO 2018193069 A1 10/2018
WO WO 2018193065 A1 10/2018

OTHER PUBLICATIONS

International Preliminary Report for International Patent Application No. PCT/EP2019/086281, date of issuance: Jun. 16, 2021, date of filing: Dec. 19, 2019, 7 pages.
Japanese Office Action for Japanese Patent Application No. 2021536238 dated Aug. 8, 2023, 4 pages.

* cited by examiner

FUNCTION CONTROL FOR AN ELECTROHYDRODYNAMIC ATOMIZER

CROSS-REFERENCES TO RELATED APPLICATIONS

This Application is a Section 371 National Stage Application of International Application No. PCT/EP2019/086281, filed Dec. 19, 2019 and published as WO/2020/127712 A1 on Jun. 25, 2020, and claims priority to German Application No. 102018133439.7, filed Dec. 21, 2018, the contents of both are hereby incorporated by reference in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The electrohydrodynamic atomization of fluids is increasingly acquiring significance in the field of coating methods. For example, PCT/EP2018/060117 discloses a device which uses electrohydrodynamic atomization e.g. care products such as for example sun block to a body of a person.

Methods for electrohydrodynamic atomization of fluids are known from the prior art.

The electrohydrodynamic atomization is based on the instability of electrically chargeable fluids, in particular fluids which are sufficiently electrically charged under high voltage, in a strong, non-homogeneous electrical field. The fluid is subjected here to a high voltage. The fluid deforms in this context to form a cone, from whose tip a thin stream, a so-called jet is emitted, which jet decomposes immediately afterwards into a spray composed of finely dispersed droplets. Under certain conditions, in the Taylor cone mode, the droplets have a narrow size distribution. Because very high electrical field strengths are necessary for the atomization, function control is advantageous in order to avoid undesired electrostatic charges.

BRIEF SUMMARY OF THE INVENTION

A method for the function control of an electrohydrodynamic atomizer, wherein an electrohydrodynamically atomized fluid, originating from the atomizer, is applied to a body, e.g. a person, in order to coat this body at least in certain areas. The atomizer comprises a fluid tank for storing the fluid and at least one high voltage source for making available a high voltage and at least one pump unit for transporting the fluid. The fluid is delivered to a nozzle arrangement of the atomizer by means of the pump unit. The fluid is atomized electrohydrodynamically at the nozzle arrangement by means of the effect of the high voltage from the high voltage source. A voltage and/or a current at the high voltage source is evaluated in order to acquire a working point of the high voltage source via a current/voltage characteristic curve.

BRIEF DESCRIPTION OF THE SEVERAL VIEWS OF THE DRAWING(S)

FIG. 1 is a diagram showing an example characteristic curve.

FIGS. 2*a*-2*d* are diagrams showing various coating situations.

DETAILED DESCRIPTION OF THE INVENTION

The object of the invention is therefore to make available function control for such devices in order to avoid undesired effects as a result of the electrohydrodynamic atomization.

This object is achieved by means of a method for function control of an electrohydrodynamic atomizer as claimed in claim 1.

In the text which follows, the invention and its advantageous developments and embodiments are explained with reference to the current/voltage characteristic curve from FIG. 1.

By way of example, various coating situations are also shown in FIGS. 2*a* to 2*d*.

In this context, an electrohydrodynamically atomized fluid originating from the atomizer is applied to a body, e.g. a person, in order to coat this body at least in certain areas. The atomizer comprises for this purpose a fluid tank for storing the fluid and at least one high voltage source for making available a high voltage and at least one pump unit for transporting the fluid. The fluid is delivered to a nozzle arrangement of the atomizer by means of the pump unit, wherein the fluid is atomized electrohydrodynamically at the nozzle arrangement by means of the effect of the high voltage from the high voltage source.

For function control there is provision here that a voltage U and/or a current I at the high voltage source are/is evaluated, in order to acquire a working point A1, A2, A3, A4 of the high voltage source via a current/voltage characteristic curve 10.

The electrohydrodynamic atomization uses the effect of a high voltage, as a result of which charges are transmitted to the fluid and from it to the body to be coated. Measurement of current and/or voltage and comparison of this measurement result with a current/voltage characteristic curve (10) permits definitive information to be obtained about the loading of the high voltage source, in particular as to whether a flow of current has occurred and therefore a coated body also again outputs the charges which are applied via the coating. If a desired flow of current occurs when a high voltage is applied, correct coating occurs and there is a return flow of the applied charges to the atomizer. Each combination of a current value and voltage value which can be achieved by means of the system during operation therefore defines a working point in the current/voltage characteristic curve.

In one preferred embodiment there is provision that the evaluated voltage U and/or the current I is a reference voltage proportional to the actual voltage value and/or current value of the high voltage source and/or is a reference current.

Using a reference voltage and a reference current provides the possibility of acquiring values and evaluating them more easily, since no high voltages have to be fed directly to measuring electronics. In this context, a reference voltage and/or a reference current value are/is made available by the high voltage source, said current value being preferably attached during the generation of the high voltage, and said current value does not directly load the high voltage circuit which is used for the atomization.

Figure 2A:
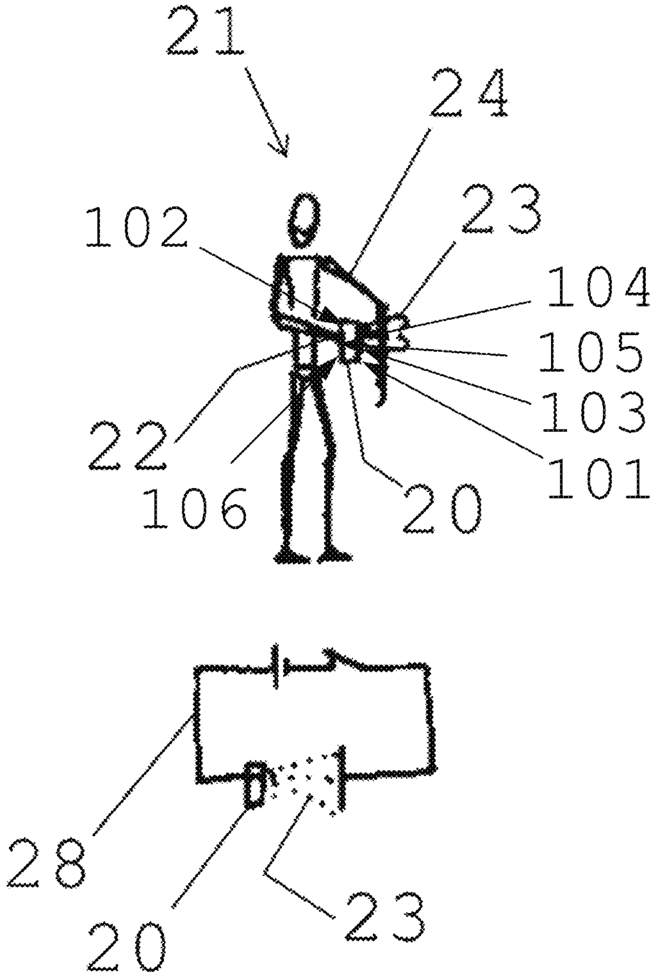

In one advantageous embodiment, such as is shown e.g. in FIG. 2*a*, the atomizer 20 is held in the hand 22 of a user 21 and a flow of current from the high voltage source via the atomized fluid 23, e.g. to the arm 24 via the body of the user 21 through the hand 22 of the user and via manual contact elements on the atomizer 20 and back to the high voltage source is acquired and evaluated.

The simplest variant of a closed circuit 28 for avoiding undesired charges and for function control of the electrohydrodynamic atomizer 20 is given by the closing of contact by the user's hand. In structural terms, to do this it is necessary to provide, e.g. on a plastic housing, conductive contact elements which are always contacted during normal use. For example, operator control pushbutton keys and corresponding operator control elements are suitable for this.

In particular, in the method there is provision that a multiplicity of working points A0 to A5 are defined on the current/voltage characteristic curve, wherein the acquired actual working point—e.g. corresponding to A3—at the high voltage source is compared with a working point of the characteristic curve A0 to A5, or is acquired at least in a range 11 on the current/voltage characteristic curve 10 between two working points A2, A4.

It is advantageous here that precise classification of the working point A3 is not necessarily required. Instead, it is sufficient to arrange an acquired working point A3 in a range 11 which is defined by setpoint working points A2, A4 which bound a setpoint working range. In this case, e.g. a low current value, which is, however, still sufficient to transport away the charges sufficiently from the coated body, define a first setpoint working point A2, and a high current value which loads the voltage source and therefore causes the absolute value of the high voltage to drop, wherein electrohydrodynamic atomization is still possible, define a second setpoint working point A4, between which the working range 11 of the atomizer lies.

Moreover, there is preferably provision that a working range 11 is defined on the current/voltage characteristic curve, wherein a fault 40 signals if the acquired working point lies outside this setpoint working range 11.

Figure 2B:
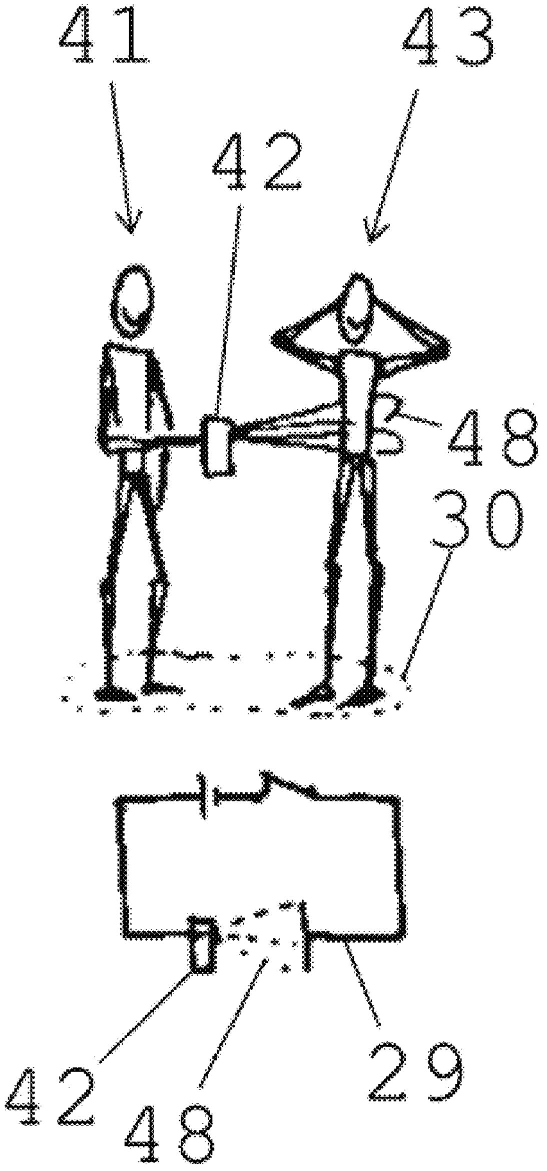
Figure 2C:
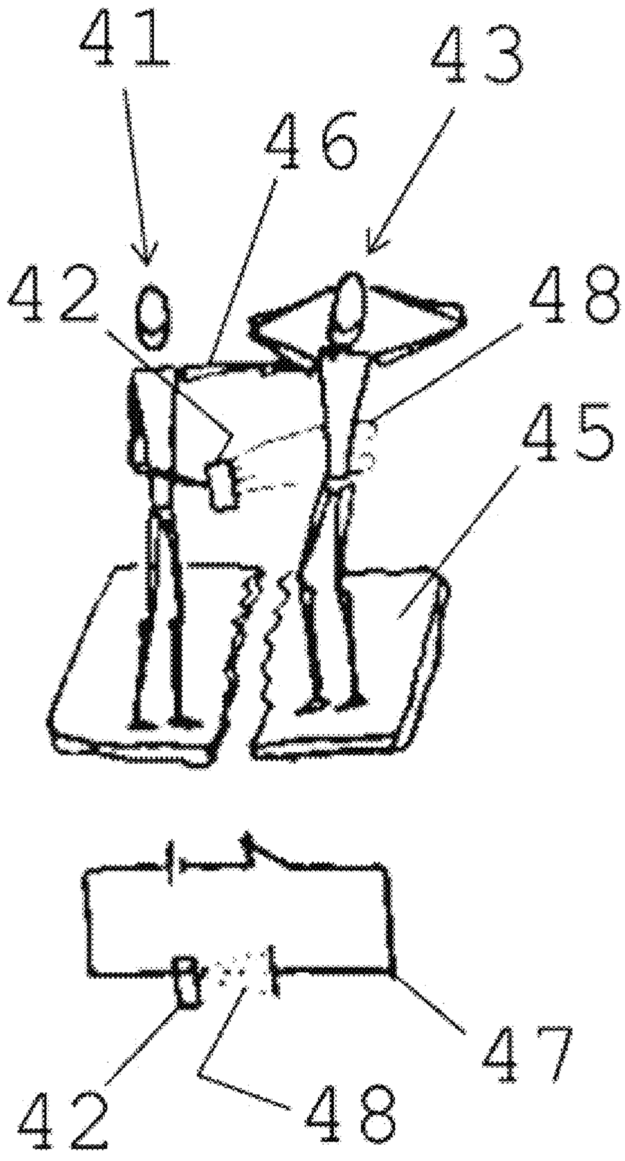
Figure 2D:
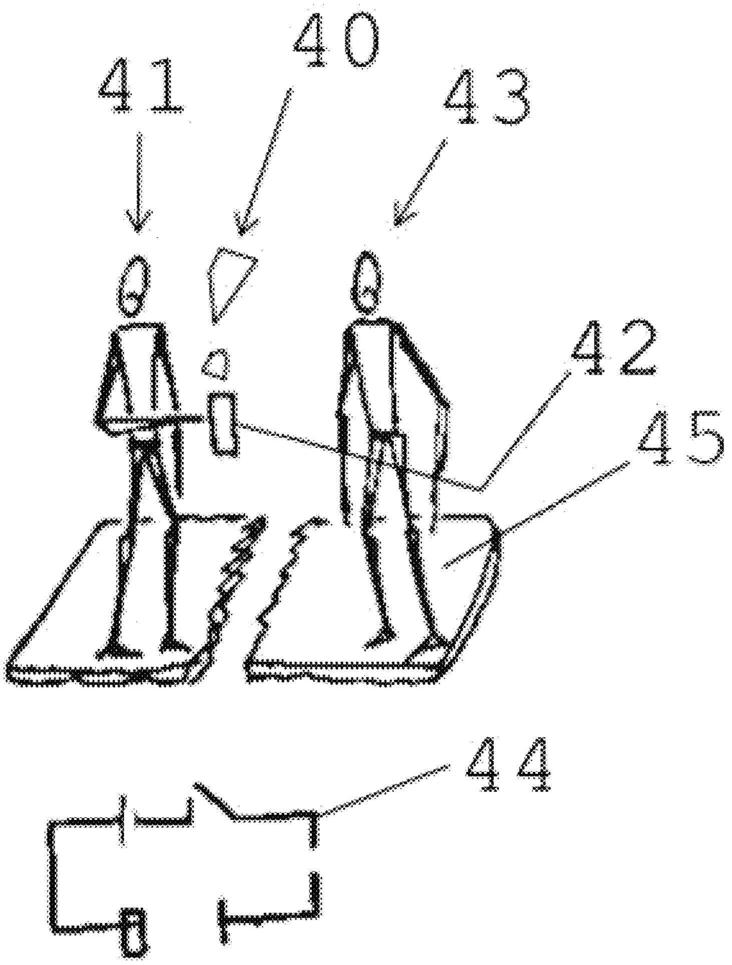

A corresponding status is illustrated in FIG. 2*d*. In this context, a first person 41 uses an atomizer 42 in order to apply a fluid to a second person 43. Owing to the open circuit 44, no flow of current I is brought about, and the working point A1, or a working point which lies elsewhere, is achieved in the fault range 12. The electrohydrodynamic atomizer will signal a fault 40 here, since a satisfactory function cannot take place. This situation occurs e.g. when the underlying surface 45 on which the persons 41, 43 are standing constitutes a sufficient insulator, and, as illustrated in FIG. 2*c*, the persons are not connected by contact 46 in order to make a closed circuit 47 possible.

In the variant illustrated in FIG. 2*c*, the working point A3 will be located in the working range 11, so that atomization 48 takes place.

An expedient development of the method provides that regular acquiring of the working point is carried out, wherein an acquired working point A3 is compared with at least one previously acquired working point A3', in order to detect a change in the working point.

Since during operation the working point depends heavily on the direct geometrical influences, such as e.g. the distance of the atomizer 20 from the object to be coated, e.g. the arm 24 in FIG. 2*a*, it is also possible to detect by means of a fluctuation of the working point whether the atomizer is being used, that is to say being moved. If the working point remains the same or stays in a defined tolerance range over a plurality of time cycles, the atomizer goes into a fault condition, since atomization or coating takes place without surface-covering application to the object to the coated. In this way, e.g. a functional fault can be avoided when putting down the atomizer.

One development also provides that the acquired working point triggers a defined user information item which is stored in a memory in accordance with the position of the working point on the current/voltage characteristic curve.

Owing to the physical line properties of the user who is included in the circuit for determining the working point there is the possibility of detecting characteristic working points in which a user information item can be retrieved from a memory. For example, direct contact can be brought about between the atomizer and the main surface during a switch-on process by which a characteristic working point occurs, e.g. in the range 13 between the working points A4 and A5 of the high flow of current of the characteristic curve 10 for precisely a said user.

In particular in the method it is also provided that a switch-on curve of the high voltage source is acquired, wherein the switch-on curve ends at a working point.

By acquiring a switch-on curve it is possible to determine what state the electrohydrodynamic atomizer is to be initially operated in. A switch-on curve K1 to the working point A1 states of the fault which is brought about e.g. by the situation according to FIG. 2*d* is aimed at.

By acquiring the switch-on curves—e.g. K1 to K4—it is possible e.g. to implement at an early time a measure which is assigned to the started working point before this working point is reached. For example, the high voltage or the pump can be blocked if a working point A5' outside the function range is aimed at via the switch-on curve K5.

The switch-on curve K2 at the working point A2, the switch-on curve K3 at the working point A3 and the switch-on curve K4 at the working point A4 in turn constitute possible operating states.

The situation according to FIG. 2*a* usually provides an internal resistance which is on the low side at the circuit 28, so that a current which is on the high side will flow, as a result of which the working point A4 is used.

In the situations according to FIGS. 2*b* and 2*c*, the resistances in the circuits 29 and 47 are expected to be higher, since the internal resistance of the two persons 41 and 43 and, if appropriate, of the conductive underlying surface 30 have to be taken into account.

Comparable objects are provided with the same reference symbols in FIGS. 2*b* to 2*d*.

The term characteristic curve according to the invention is also to be understood as meaning collections of characteristic data which can be compared with acquired working points in order to carry out the function control according to the invention.

A further preferred embodiment of the method such as can be given e.g. in FIG. 2*a*, provides that the evaluated voltage U and/or the current I is corrected by means of at least one correction parameter. It is problematic that owing to the given spatial proximity between the hand 22 of the user 21 which is operating the atomizer 20 and the atomized fluid 23 a considerable flow of current or drop in voltage occurs directly between the holding hand 22 and the atomizer 20 without said flow of current or drop in voltage contributing to the coating result. The influence of the direct flow of current and/or of the direct drop in voltage between the atomizer 20 and the hand 22 of the user 21 which operates the atomizer 20 can be acquired by means of at least one correction parameter, e.g. by means of a calibration operation or a measuring pulse. It is then possible to use this at least one correction parameter to determine e.g. an interference variable or the like which is included in the method for function control.

Although the present invention has been described with reference to preferred embodiments, workers skilled in the art will recognize that changes may be made in form and detail without departing from the spirit and scope of the invention.

LIST OF REFERENCE SYMBOLS

10 Current/voltage characteristic curve
11 Range
12 Fault range
20 Atomizer
21 User
22 Hand
23 Atomized fluid
24 Arm
28 Closed circuit
29 Circuit
30 Conductive underlying surface
40 Fault
41 First person
42 Atomizer
43 Second person
44 Open circuit
45 Underlying surface
46 Contact
47 Circuit
48 Atomization
101 Fluid tank
102 High voltage source
103 Pump unit
104 Nozzle arrangement
105 Manual contact element on the atomizer
106 Manual contact element on the atomizer
A0-A5 Working point
A3 Previously acquired working point
A5' Working point
I Current/flow of current
K1-K4 Switch-on curves
U Voltage

The invention claimed is:

1. A method for function control of an electrohydrodynamic atomizer that applies a fluid to a body, in order to coat one or more areas of the body at least in certain areas, wherein the electrohydrodynamic atomizer comprises a fluid tank for storing the fluid and at least one voltage source configured to provide a voltage and at least one pump unit for transporting the fluid, wherein the fluid is delivered to a nozzle arrangement of the electrohydrodynamic atomizer by the pump unit, and wherein the fluid is atomized electrohydrodynamically at the nozzle arrangement at least in part by an effect of the voltage from the voltage source, the method comprising:

evaluating a voltage and/or a current at the voltage source to acquire a working point of the voltage source via a current/voltage characteristic curve, identifying a setpoint working range defined on the current/voltage characteristic curve, detecting occurrence of a fault based on determining a change from at least one previously acquired working point lying inside the setpoint working range to the acquired working point lying outside the setpoint working range, and controlling the electrohydrodynamic atomizer to render, to a user, a defined user information item that indicates the occurrence of the fault.

2. The method as claimed in claim 1, wherein the evaluated voltage and/or the current comprises:

a reference voltage proportional to an actual voltage value and/or current value of the voltage source and/or is a reference current.

3. The method as claimed in claim 1 wherein the electrohydrodynamic atomizer is held in a hand of the user, and the method comprises acquiring and evaluating a flow of current from the voltage source via the electrohydrodynamically atomized fluid through the hand of the user and via manual contact elements on the electrohydrodynamic atomizer and back to the voltage source.

4. The method as claimed in claim 1, wherein a multiplicity of working points are defined on the current/voltage characteristic curve, wherein the acquired working point at the voltage source is compared with one or more working points in the multiplicity of working points, or is acquired at least in a range on the current/voltage characteristic curve between two working points in the multiplicity of working points.

5. The method as claimed in claim 1, wherein the method comprises triggering a device reaction in response to the acquired working point.

6. The method as claimed in claim 1, and further comprising:

operating the electrohydrodynamic atomizer based on a switch-on curve of the voltage source, wherein the switch-on curve defines one or initial operating states of the voltage source and ends at a working point.

7. The method as claimed in claim 1, and further comprising correcting the evaluated voltage and/or the current based on at least one correction parameter such that a direct flow of current and/or a direct drop in voltage between the electrohydrodynamic atomizer and a hand of the user which operates the electrohydrodynamic atomizer is acquired.

8. An electrohydrodynamic atomizer system comprising:

a nozzle arrangement configured to apply a fluid to a body, wherein the fluid is atomized electrohydrodynamically at the nozzle arrangement by an effect of a voltage from a voltage source; and a pump unit configured to deliver the fluid to the nozzle arrangement, wherein the electrohydrodynamic atomizer system is configured to:

evaluate a voltage and/or a current at the voltage source to acquire a working point of the voltage source via a current/voltage characteristic curve, identify a setpoint working range defined on the current/voltage characteristic curve, detect occurrence of a fault based on determining a change from at least one previously acquired working point lying inside the setpoint working range to the acquired working point lying outside the setpoint working range, and control the electrohydrodynamic atomizer to render, to a user, a defined user information item that indicates the occurrence of the fault.

9. The voltage source of claim 8, wherein a low voltage signal which is proportional to the voltage which is output can be tapped as a reference voltage.

10. The method as claimed in claim 5, wherein the acquired working point triggers a connection which is stored in a memory in accordance with a position of the working point on the current/voltage characteristic curve.

11. The method as claimed in claim 1, wherein the body comprises a person.

12. The method as claimed in claim 1, and further comprising evaluating, as an interference variable, a direct flow of current and/or a direct drop in voltage between the electrohydrodynamic atomizer and a hand of the user which operates the electrohydrodynamic atomizer.

* * * * *